(12) United States Patent
Luger et al.

(10) Patent No.: US 8,853,871 B2
(45) Date of Patent: Oct. 7, 2014

(54) ROLLER, IN PARTICULAR TRACK ROLLER OR CARRYING ROLLER FOR CABLEWAY SYSTEMS

(71) Applicant: Innova Patent GmbH, Wolfurt (AT)

(72) Inventors: Peter Luger, Dornbirn (AT); Johannes Moritzhuber, Hard (AT)

(73) Assignee: Innova Patent GmbH, Wolfurt (AT)

( * ) Notice: Subject to any disclaimer, the term of this patent is extended or adjusted under 35 U.S.C. 154(b) by 0 days.

(21) Appl. No.: 13/743,929

(22) Filed: Jan. 17, 2013

(65) Prior Publication Data

US 2013/0200631 A1 Aug. 8, 2013

(30) Foreign Application Priority Data

Feb. 6, 2012 (AT) ...................................... 155/2012

(51) Int. Cl.
*F02B 63/04* (2006.01)
*B61B 12/02* (2006.01)
*H02K 7/08* (2006.01)

(52) U.S. Cl.
CPC . *H02K 7/08* (2013.01); *B61B 12/02* (2013.01)
USPC ........................................................ 290/1 R

(58) Field of Classification Search
CPC ........................... H02K 7/1853; A63B 21/0053
USPC .................................................. 290/1 A, 1 R
See application file for complete search history.

(56) References Cited

U.S. PATENT DOCUMENTS

| 5,236,055 A | 8/1993 | Legal |
| 5,327,034 A | 7/1994 | Couture et al. |
| 5,920,136 A | 7/1999 | Schmid |
| 8,093,731 B2 * | 1/2012 | Bulthaup et al. .............. 290/1 R |
| 2008/0276826 A1 | 11/2008 | Erhart |
| 2010/0180792 A1 | 7/2010 | Bavaresco et al. |

FOREIGN PATENT DOCUMENTS

| DE | 9201088 U1 | 3/1993 |
| DE | 102008004085 A1 | 7/2009 |
| EP | 1 992 539 A1 | 11/2008 |
| WO | 9315546 A1 | 8/1993 |
| WO | 9401917 A1 | 1/1994 |
| WO | 9622895 A1 | 8/1996 |
| WO | 2008/129019 A1 | 10/2008 |
| WO | 2009086886 A1 | 7/2009 |

* cited by examiner

*Primary Examiner* — Tho D Ta
(74) *Attorney, Agent, or Firm* — Laurence A. Greenberg; Werner H. Stemer; Ralph E. Locher

(57) ABSTRACT

A roller, in particular track roller or a carrying roller for use in a cableway system is formed with a cylindrical tubular piece that is located radially on the inside, two annular bearings that are located radially outside the tubular piece and at an axial distance from each other, and a roller body that is located radially outside the annular bearings. The roller body is formed of a track ring and two flanged disks located to the sides thereof. The roller includes an annular electric generator which is located within a cavity surrounded by the roller body and the two annular bearings.

14 Claims, 6 Drawing Sheets

ROLLER, IN PARTICULAR TRACK ROLLER OR CARRYING ROLLER FOR CABLEWAY SYSTEMS

CROSS-REFERENCE TO RELATED APPLICATION

This application claims the priority, under 35 U.S.C. §119, of Austrian patent application AT A155/2012, filed Feb. 6, 2012; the prior application is herewith incorporated by reference in its entirety.

BACKGROUND OF THE INVENTION

Field of the Invention

The present invention relates to a roller, in particular a track roller or a carrying roller, for use in cableway systems. The roller has a cylindrical tubular piece located radially on the inside, two annular bearings which are located radially outside the tubular piece and at an axial distance from each other, and a roller body which is located radially outside the annular bearings and is embodied by a track ring and by two flanged disks located to the sides thereof.

It is known in conveying systems having vehicles which are movable along carrying cables or along guide rails to supply the electric devices located in the vehicles with electric energy by means of accumulators. In that case, the accumulators have to be charged up in the stations of the conveying systems, but this necessitates a large technical outlay in the case of conveying systems in which the vehicles are permanently in movement. In addition, as electric apparatuses increase in size, the accumulators are required to have increased capacity. For this primary reason, it would be desirable to produce the required electric energy by way of the movement of the vehicles, wherein the electric apparatuses and systems are supplied directly with current and the accumulators are charged up.

United States Patent Application Publication US 2008/0276826 A1 and its counterpart European patent EP 1 992 539 B1, which are commonly assigned with the instant application, described a cableway system in which cable cars are moved along a carrying cable and the running gear of the cable cars is equipped with at least one friction wheel which rolls along the carrying cable and which is embodied with a generator which is operated by the friction wheel. This makes it possible, by the movement of the cable cars along a carrying cable, to generate current by means of the generator located on the running gear, the current being used to supply the electric devices and systems located in the cable cars directly with current and to charge up accumulators.

However, that known device necessitates considerable extra technical outlay since the running gear of the cable cars additionally has to be embodied with at least one friction wheel.

United States Patent Application Publication US 2010/0180792 A1 and its counterpart International Patent Application WO 2008/129019 A1 describe a conveying system which has vehicles provided with track rollers, wherein one of the track rollers is embodied with a generator. In that case, the generator is located on the outside of the track roller, and the rotor of that generator is rotated simultaneously with the track roller.

However, that known device is disadvantageous since it has be to be taken into consideration in the structural configuration of the entire conveying system that the vehicles are embodied with at least one track roller from which a generator protrudes in the axial direction. In addition, the generator which is located on the outside of the track rollers has to be protected against interfering influences, in particular against the ingress of moisture and water.

There is furthermore the fact in the case of cableway systems that the carrying and conveying cables for the cable cars and the traction cables for cable cars moving along carrying cables are guided in the region of supports via carrying rollers which are rotated by the movement of the carrying and conveying cables and of the traction cables and that electric devices, such as transmitters, receivers, control apparatuses, measuring apparatuses etc. for which an electric supply has to be provided, are also provided on supports. Up to now, those electric devices have been supplied with current via electric lines that are laid to the supports. As an alternative thereto, the supports are provided with solar collectors and accumulators for effecting the supply of electricity.

SUMMARY OF THE INVENTION

It is accordingly an object of the invention to provide a roller assembly which overcomes the above-mentioned disadvantages of the heretofore-known devices and methods of this general type and which provides for a roller, in particular a track roller, for a vehicle of a cableway system and a carrying roller for a carrying and conveying cable and for a traction cable of a cableway system, wherein the roller, upon rotation thereof, also fulfills the function of an electric generator, and yet wherein the disadvantages affecting the prior such roller assemblies that are embodied with a generator are avoided.

With the foregoing and other objects in view there is provided, in accordance with the invention, a roller assembly for a cableway system, in particular a track roller or a carrying roller, which comprises:

a radially inner cylindrical tubular piece;

two annular bearings located radially outside the tubular piece and at an axial spacing distance from one another;

a roller body disposed radially outside the annular bearings and formed of a track ring and two flanged disks disposed laterally of the track ring; and an annular electric generator disposed within a cavity surrounded by the roller body and the two annular bearings.

In other words, the objects of the invention are achieved with a roller assembly, in particular with a track roller or a carrying roller for use in cableway systems, that includes a cylindrical tubular piece located radially on the inside, two annular bearings which are located radially outside the tubular piece and at an axial distance from each other, and a roller body which is located radially outside the annular bearings and is embodied by a track ring and by two flanged disks located to the sides thereof, in that the roller is embodied with an annular electric generator which is located within a cavity surrounded by the roller body and the two annular bearings.

In a preferred embodiment, the electric generator is formed by an annular stator with at least one induction coil and by at least one permanent magnet which is movable in relation to the stator, wherein the annular stator, which is carried by the tubular piece, is located radially outside the tubular piece and in the axial direction between the two annular bearings, and the at least one permanent magnet, which is located radially outside the stator, is connected for rotation to the roller body, which is rotatable in relation to the tubular piece.

In this case, the at least one permanent magnet can be located on a carrying ring or permanent magnets can be embodied as a carrying ring, wherein the carrying ring is fastened to the roller body. Furthermore, the annular stator can be located on an annular carrier arranged on the tubular piece.

According to a further preferred embodiment, the roller body is embodied in two parts and the two parts of the roller body surround the annular cavity in which the annular generator is located.

Other features which are considered as characteristic for the invention are set forth in the appended claims.

Although the invention is illustrated and described herein as embodied in a roller, in particular track roller or carrying roller for cableway systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
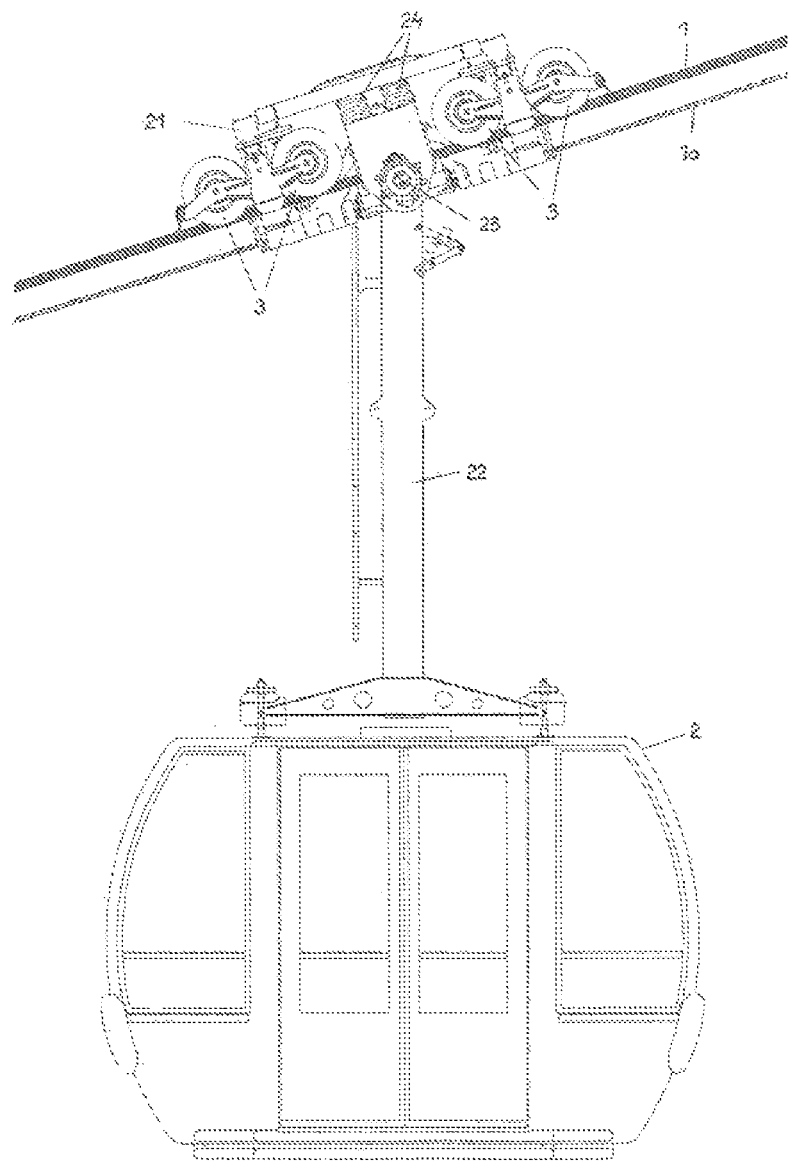
FIG. 1 is a side view of a section of a cableway system with a cable car that is movable along a carrying cable of the cableway system by way of a running gear that is moved by a traction cable.

Referring now to the figures of the drawing in detail and first, particularly, to FIG. 1 thereof, there is shown a section of a cableway system with a carrying cable 1, a traction cable 1a and a cable car 2. The cable cars 2 of the system are movable along the carrying cable 1 by way of the traction cable 1a. The cableway cars 2 are embodied with track rollers 3 mounted on a running gear 21, wherein the running gear 21, to which the cable car 2 is fastened by means of a carrying rod 22, is movable along the carrying cable 1. The carrying rod 22 is pivotable on the running gear 21 about an axis oriented approximately at a right angle to the direction of movement and approximately horizontally by means of a joint 23. The running gear 21 is embodied with a clamping device 24 by way of which the cable car 2 can be coupled to the traction cable 1a.

Figure 2:
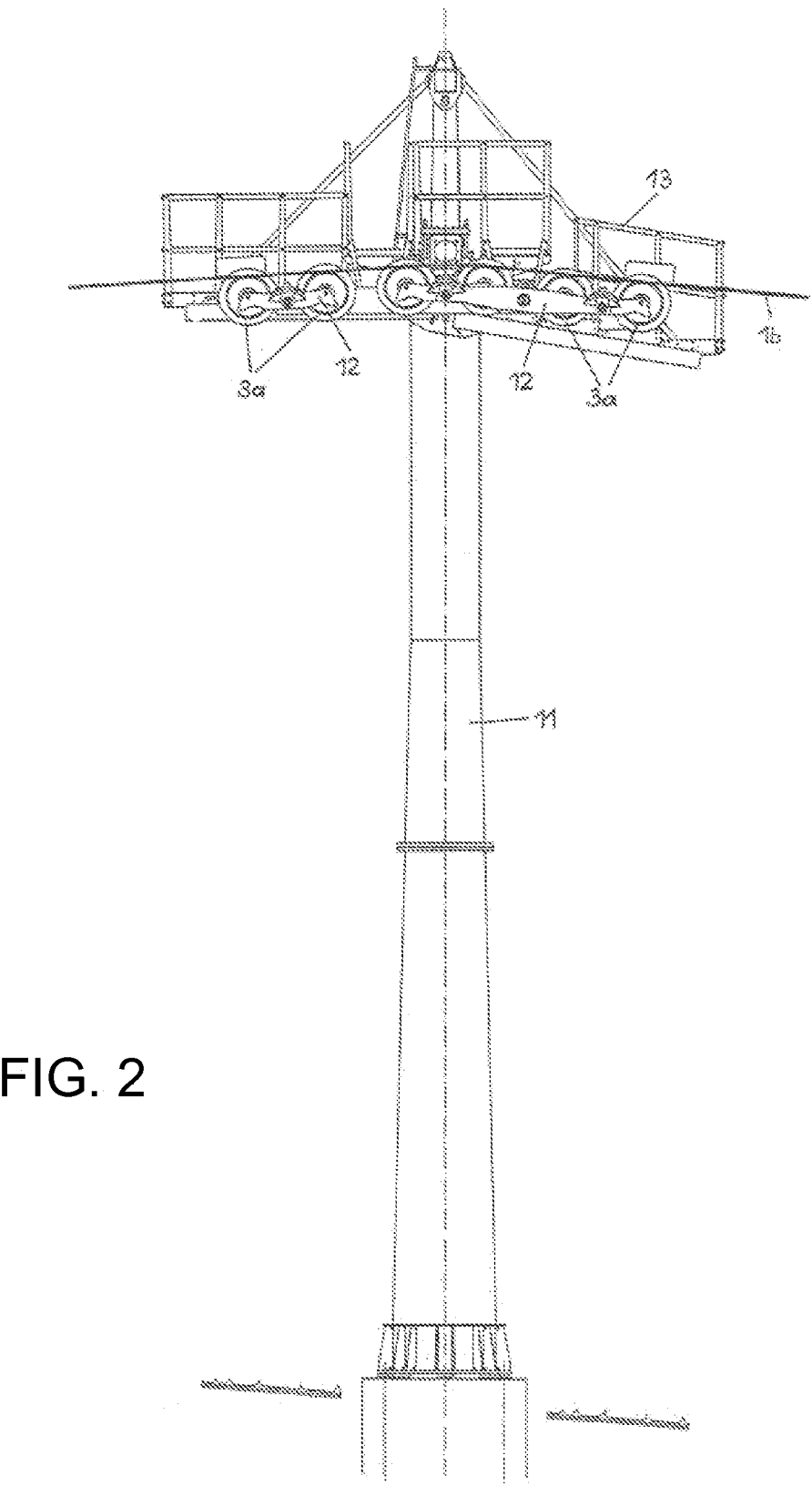
FIG. 2 is a side view of a cableway system support on which a roller battery is disposed via which a carrying and conveying cable is guided.

FIG. 2 illustrates a support 11 of the cableway system, at the upper end of which support carrying rollers 3a are located, said carrying rollers being arranged on rockers 12 and via which a carrying and conveying cable 1b is guided. The carrying rollers 3a are rotated by the movement of the carrying and conveying cable 1b. A maintenance platform 13 is furthermore located at the upper end of the support 11.

Figure 3:
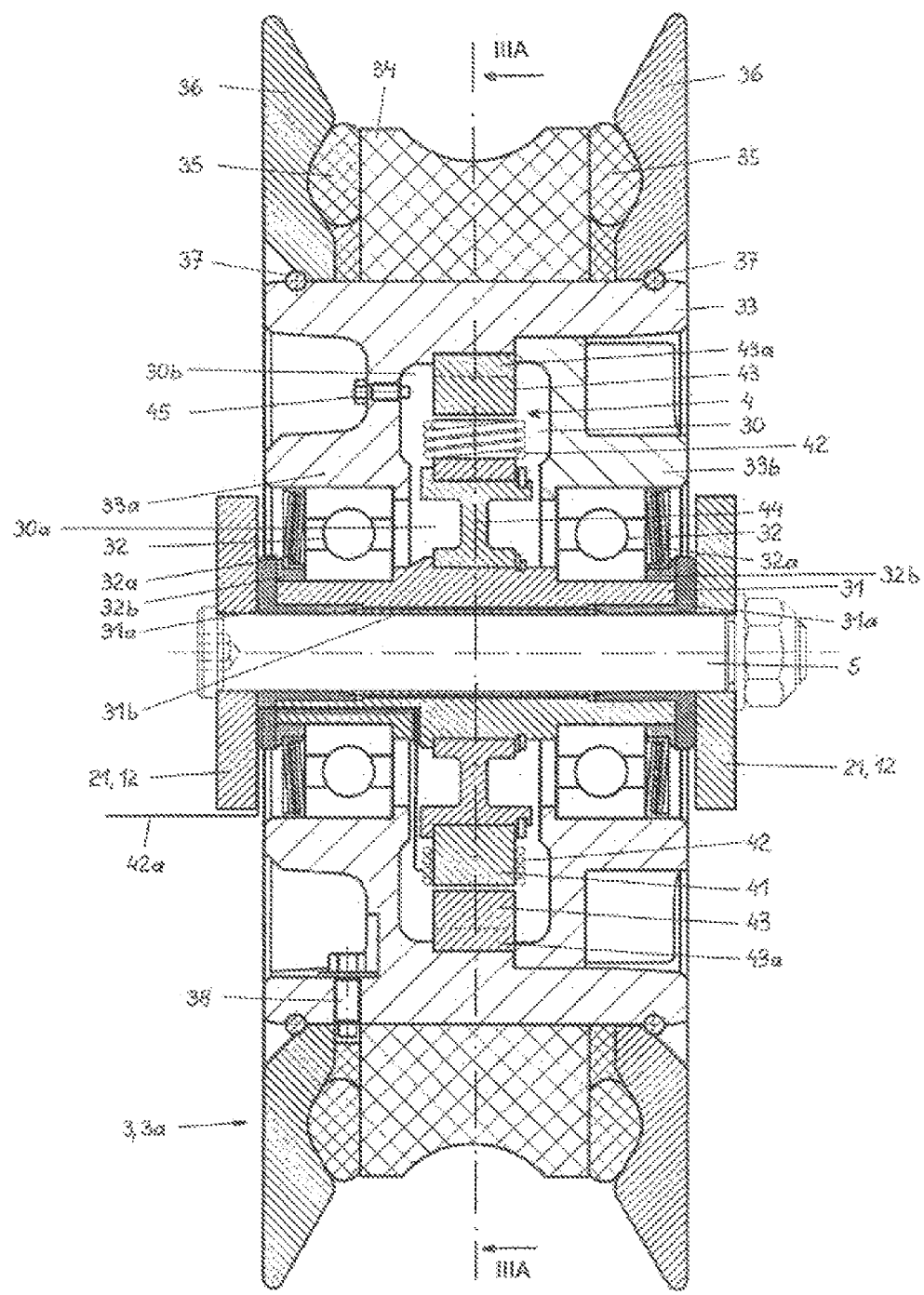
FIG. 3 is an axial section taken through a first embodiment of a track roller or carrying roller assembly according to the invention for a cableway system.
Figure 3A:
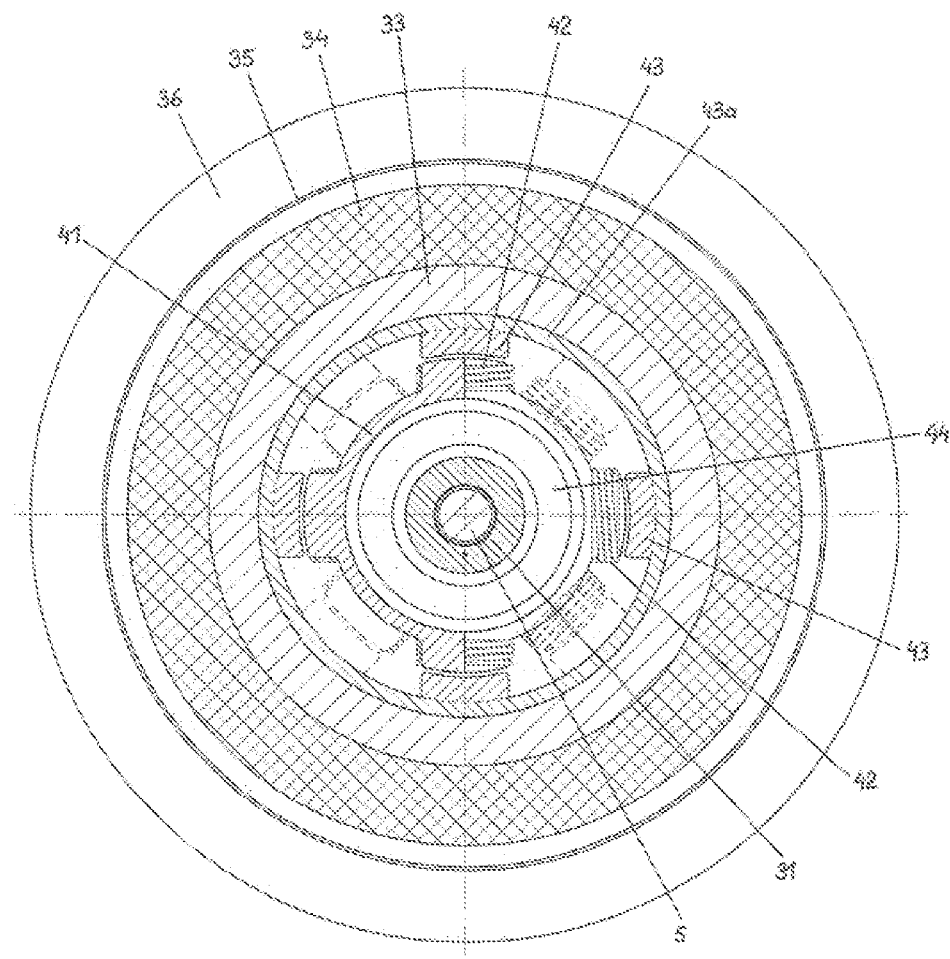
FIG. 3A is a section taken along the line IIIA-IIIA of FIG. 3 showing the track roller or cable roller on a reduced scale in relation to FIG. 3.

The track roller 3 and carrying roller 3a respectively illustrated in FIG. 3 and FIG. 3A comprises a cylindrical tubular piece 31 which is located radially on the inside, is embodied with steps on the radial circumference thereof and onto which two annular bearings 32 located at an axial distance from each other are placed, the bearings being assigned sealing lamellae 32a and being kept in the axial positions thereof by means of spacer rings 32b. The roller body 33 is located radially outside the two annular bearings 32. A track ring 34 is located radially outside the roller bearing 33, and respective flanged disks 36 are fitted to the sides of said track ring with the interposition of elastic rings 35. The flanged disks 36 are kept in the position thereof on the roller body 33 by securing rings 37. The roller body 33 consists of two roller body parts 33a and 33b.

Electrically insulating sleeves 31a are inserted into the tubular piece 31 at both ends thereof and a central sleeve 31b is inserted in the central region thereof, which sleeves 31a and 31b consist of a plastics material. The track ring 34 is produced from a rigid elastic plastics material. The elastic rings 35 serve to press the two flanged disks 36 against the securing rings 37. A screw 38 which serves for positionally securing the track ring 34 is furthermore located in the roller body 33.

Between the tubular piece 31 and the roller body 33 there is an annular cavity 30 which is formed by the two annular bearings 32 being located at an axial distance from each other, thus forming an annular space 30a therebetween, and by the roller body 33 being embodied in the central region thereof with an annular recess 30b. The annular cavity 30 contains a generator 4 which consists of an annular soft iron core 41, induction coils 42 located on said soft iron core and permanent magnets 43 assigned to the latter. The induction coils 42 are connected in series. The soft iron core 41 is fastened on a carrying ring 44 which is likewise placed onto the tubular piece 31. The permanent magnets 43 are fastened on a carrying ring 43a or are embodied as a carrying ring 43a, wherein said carrying ring 43a is likewise inserted into the cavity 30 located within the roller body 33 and is coupled for rotation to the roller body 33.

In this case, the soft iron core 41 together with the induction coils 42 constitutes the stator of the generator 4. By contrast, the permanent magnets 43, which are rotatable together with the roller body 33 in relation to the tubular piece 31, constitute the rotor of the generator 4. A line 42a which is led out of the roller 3, 3a is connected to the induction coils 42. The roller body part 33a is embodied with a pressure compensating element 45 through which moisture located in the cavity 30 can escape out of the latter.

The track roller 3 or carrying roller 3a is fastened to the running gear 21 of a cable car 2 or on a rocker 12 which is located on a carrying support 11 by means of a bolt 5 passing through the tubular piece 31. By this means, the tubular piece 31 and, by means of the latter, the stator of the generator 4 are arranged in a manner mounted on the framework, whereas the roller body 33 and, by means of the latter, the permanent magnets 43 are rotatable in relation to the tubular piece 31 by means of the annular bearings 32.

Rotation of the roller body 33 in relation to the tubular piece 31 causes the permanent magnets 43 to move in relation to the induction coils 42, thus generating an alternating current in the latter, said current being guided via the line 42a to the electric consumers provided in the cable car 2 and to accumulators provided on the supports 11. A track roller 3 is rotated by rolling of the latter along a carrying cable 1, and a carrying roller 3a is rotated by a traction cable 1a which is guided via the latter or by a carrying and conveying cable 1b guided via the latter.

Figure 4:
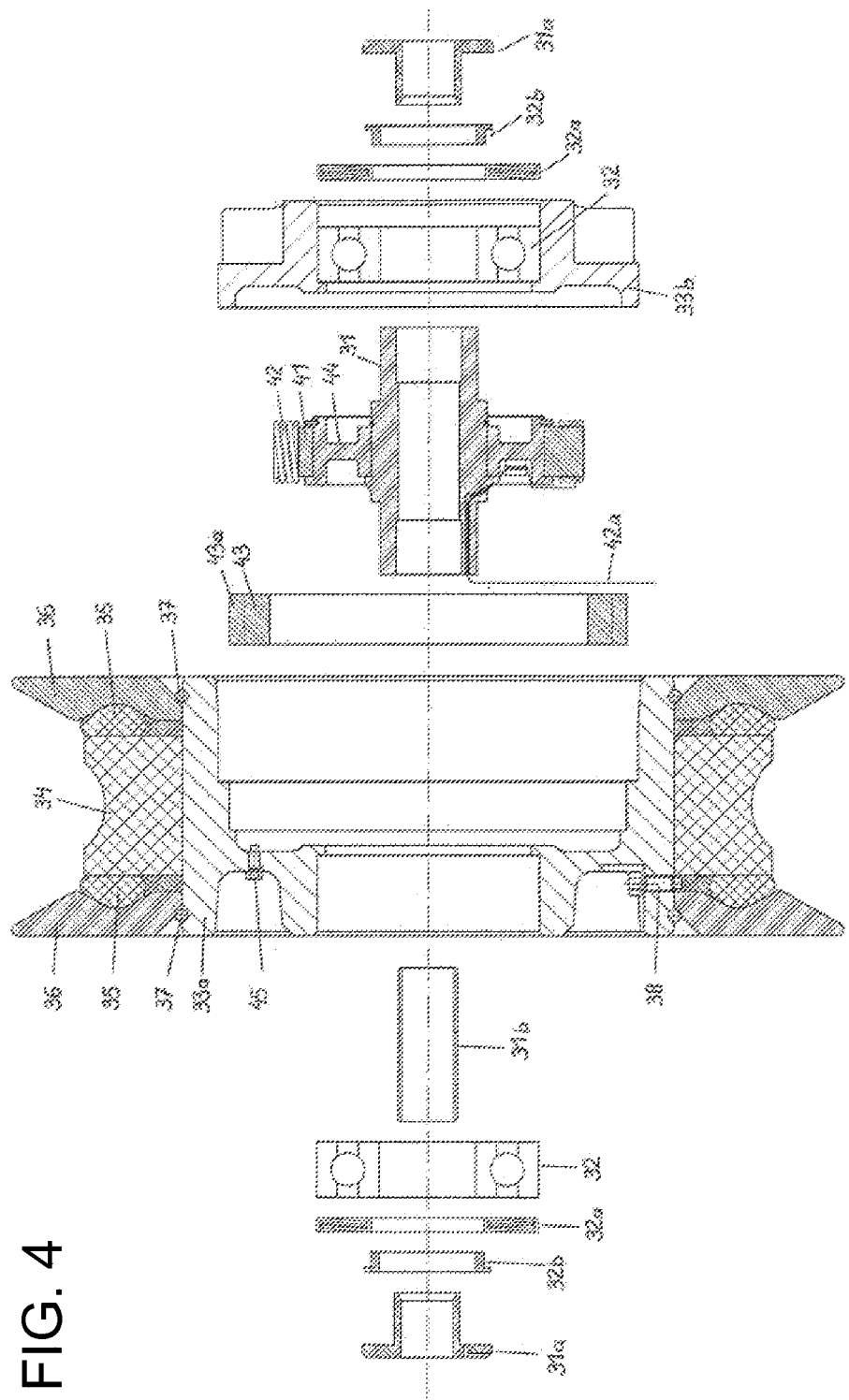
FIG. 4 is an exploded sectional view of the track roller or carrying roller assembly shown in FIG. 3, again illustrated on a reduced scale in relation to FIG. 3.

The composition of a carrying roller 3 or of a track roller 3a is explained below with reference to FIG. 4. The first roller body part 33a is embodied with the track ring 34, the elastic rings 35, the flanged disks 36, the securing rings 37, the pressure compensating element 45 and with the securing screw 38. The inner surface of the first roller body part 33a is embodied with steps running all the way around. The carrying ring 43a together with the permanent magnets 43 is inserted into the roller body part 33a from the right. The left annular bearing 32 is then pressed in from the left. Subsequently, the preassembled tubular piece 31 with the carrying ring 44, the soft iron core 41, the induction coils 42 and the line 42a is inserted into the annular left bearing 32 from the right. The second roller body part 33b together with the annular right bearing 32 pressed into the latter is then inserted from the right into the first roller body part 33a and onto the tubular piece 31. Finally, the sleeve 31b, a sealing lamella 32a, a spacer ring 32b and a sleeve 31a are inserted from the left, and a sealing lamella 32a, a spacer ring 32b and a sleeve 31a are inserted from the right.

Figure 5:
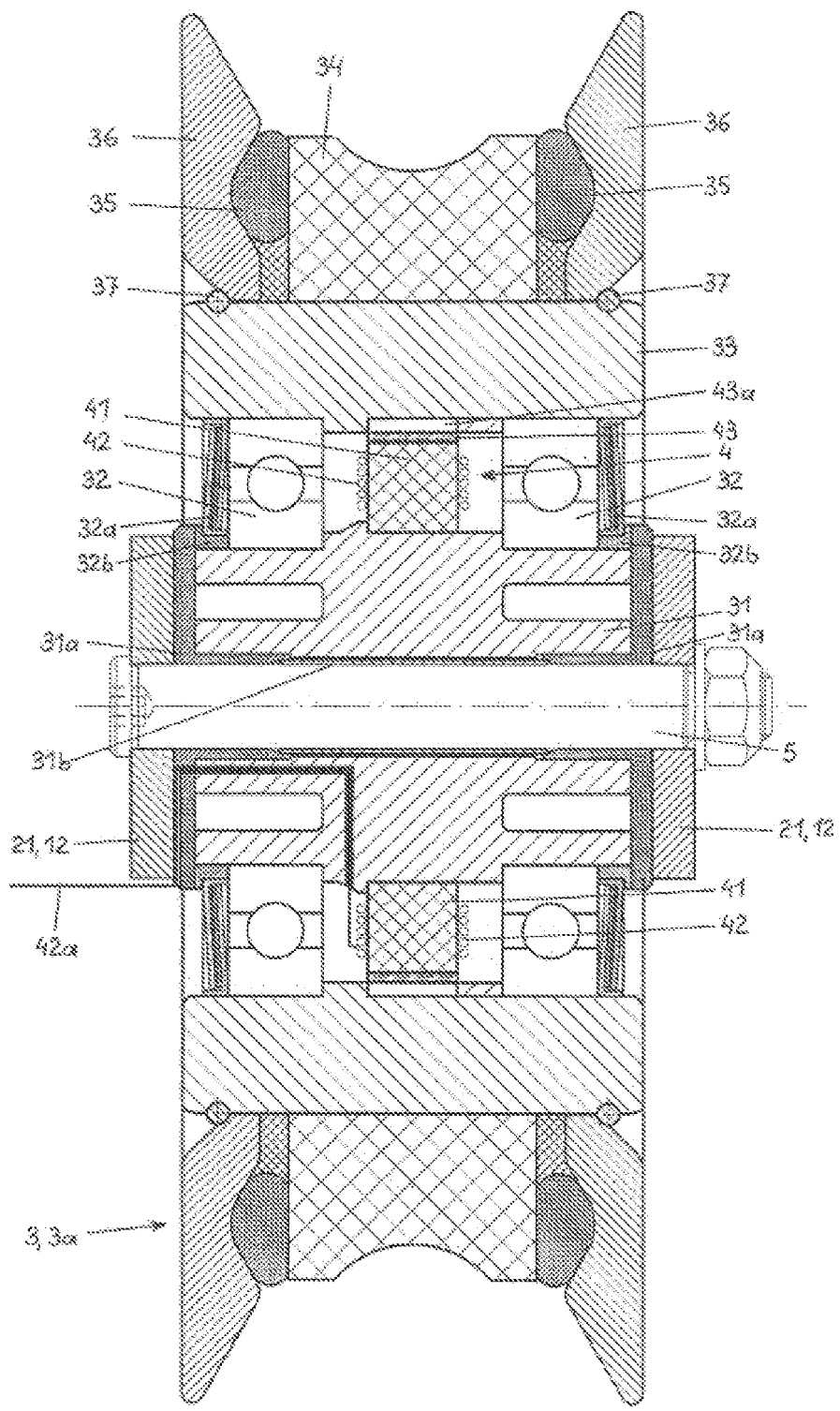
FIG. 5 is an axial section through a second embodiment of a track roller or carrying roller according to the invention.

The second embodiment, illustrated in FIG. 5, of a track roller 3 or carrying roller 3a according to the invention substantially coincides with the track roller 3 or carrying roller 3a illustrated in FIG. 3, wherein the functionally identical components are provided with same reference numbers. Said track roller 3 or carrying roller 3a differs from the roller 3, 3a according to FIG. 3 in that the roller body 33 is embodied as a single piece, wherein said roller body is approximately hollow and cylindrical. By this means, the carrying ring 31, the soft iron core 41 together with the induction coils 42, the carrying ring 43a embodied with the permanent magnets 43, the two annular bearings 32, the sealing lamellae 32a, the spacer rings 32b and the sleeves 31a and 31b can be inserted into said roller body.

This results in the production of a track roller 3 or a carrying roller 3a, the outer configuration of which corresponds identically to the track rollers or carrying rollers used in the cableway system, thus enabling it to be useable instead of one of the track rollers or carrying rollers, wherein it also fulfils the function of an electric generator without further technical measures being required for this purpose. A track roller or carrying roller of this type additionally serves to generate current in order to feed electric apparatuses or accumulators.

Owing to the fact that the generator 4 is located in the interior of said track roller 3 or carrying roller 3a, the generator is optimally protected from climatic influences, in particular from the ingress of water or moisture.

The invention claimed is:

1. A roller of a cableway system, comprising:
a cylindrical tubular piece located radially inside;
two annular bearings located radially outside said tubular piece and at an axial spacing distance from one another;
a roller body disposed radially outside said annular bearings and formed of a track ring and two flanged disks disposed laterally of said track ring, said track ring being dimensioned to roll on a carrying cable of the cableway system and to support a cable car suspended from the carrying cable; and
an annular electric generator disposed within a cavity surrounded by said roller body and said two annular bearings.

2. The roller assembly according to claim 1, wherein said electric generator comprises:
an annular stator with at least one induction coil and at least one permanent magnet movably disposed relative to said stator; and
wherein said annular stator is carried by said tubular piece and is disposed radially outside said tubular piece and in axial direction between said two annular bearings; and
wherein said at least one permanent magnet is disposed radially outside said stator and connected for rotation to said roller body, which is rotatable about said tubular piece.

3. The roller assembly according to claim 2, which comprises a carrying ring fastened to said roller body and carrying said at least one permanent magnet.

4. The roller assembly according to claim 2, wherein said at least one permanent magnet is a carrying ring and said carrying ring is fastened to said roller body.

5. The roller assembly according to claim 2, which comprises an annular carrier disposed on said tubular piece and carrying said annular stator.

6. The roller assembly according to claim 2, wherein said roller body is formed in two roller body parts, and said two roller body parts surround said annular cavity in which said annular generator is disposed.

7. The roller assembly according to claim 2, wherein said roller body is formed in two roller body parts, and said two roller body parts surround said cavity in which said annular generator is disposed.

8. A roller of a cableway system, comprising:
a cylindrical tubular piece located radially inside;
two annular bearings located radially outside said tubular piece and at an axial spacing distance from one another;
a roller body disposed radially outside said annular bearings and formed of a track ring and two flanged disks disposed laterally of said track ring; and
an annular electric generator disposed within a cavity surrounded by said roller body and said two annular bearings, said electric generator including:
an annular stator with at least one induction coil and at least one permanent magnet movably disposed relative to said stator; and
wherein said annular stator is carried by said tubular piece and is disposed radially outside said tubular piece and in axial direction between said two annular bearings; and
wherein said at least one permanent magnet is disposed radially outside said stator and connected for rotation to said roller body, which is rotatable about said tubular piece.

9. The roller assembly according to claim 8, which comprises a carrying ring fastened to said roller body and carrying said at least one permanent magnet.

10. The roller assembly according to claim 8, wherein said at least one permanent magnet is a carrying ring and said carrying ring is fastened to said roller body.

11. The roller assembly according to claim 8, which comprises an annular carrier disposed on said tubular piece and carrying said annular stator.

12. The roller assembly according to claim 8, wherein said roller body is formed in two roller body parts, and said two roller body parts surround said annular cavity in which said annular generator is disposed.

13. The roller assembly according to claim 8, wherein said roller body is formed in two roller body parts, and said two roller body parts surround said cavity in which said annular generator is disposed.

14. A roller of a cableway system, comprising:
a cylindrical tubular piece located radially inside and configured to be supported on a stationary support of the cableway system;
two annular bearings located radially outside said tubular piece and at an axial spacing distance from one another;
a roller body disposed radially outside said annular bearings and formed of a track ring and two flanged disks disposed laterally of said track ring, said track ring being dimensioned for a carrying or conveying cable of the cableway system and to support the carrying or conveying cable relative to the stationary support; and
an annular electric generator disposed within a cavity surrounded by said roller body and said two annular bearings.

* * * * *